United States Patent [19]

Weyandt, Jr.

[11] Patent Number: 4,997,146
[45] Date of Patent: Mar. 5, 1991

[54] ELECTRONIC SUN INCIDENCE AVOIDANCE DEVICE

[75] Inventor: Charles J. Weyandt, Jr., Mountain View, Calif.

[73] Assignee: Ford Aerospace Corporation, Newport Beach, Calif.

[21] Appl. No.: 358,733

[22] Filed: May 30, 1989

[51] Int. Cl.⁵ .............................................. B64G 1/24
[52] U.S. Cl. ................................ 244/164; 244/158 R; 244/171
[58] Field of Search ...................... 244/3.21, 164, 171, 244/173, 158 R

[56] References Cited

U.S. PATENT DOCUMENTS

| | | | |
|---|---|---|---|
| 3,348,374 | 10/1967 | Schalkowsky | 60/641.13 |
| 3,427,453 | 2/1969 | Gill et al. | 250/394 |
| 3,439,884 | 4/1969 | Slater | 244/171 |
| 3,752,993 | 8/1973 | Davidson et al. | 250/203 R |
| 4,012,018 | 3/1977 | Lorell et al. | 244/165 |
| 4,288,051 | 9/1981 | Goschel | 244/164 |
| 4,358,076 | 11/1982 | Lange et al. | 244/164 |
| 4,371,135 | 2/1983 | Keigler | 244/173 |
| 4,375,878 | 3/1983 | Harvey et al. | 244/158 R |
| 4,508,297 | 4/1985 | Mouilhayrat et al. | 244/173 |
| 4,674,715 | 6/1987 | Frisch | 244/171 |

Primary Examiner—Charles T. Jordan
Assistant Examiner—Rochelle Lieberman
Attorney, Agent, or Firm—Edward J. Radlo; Kenneth R. Allen; Keith L. Zerschling

[57] ABSTRACT

One-dimensional sun sensing and angle measurement assemblies are deployed with substantially totally overlapping fields of view on a plane of a spacecraft body to protect sensors within a protected angular area of the plane, each of the analog sun sensors generating a signal indicative of incident sun along one axis and the presence of sunlight along an orthogonal axis thereto in the common plane. The sensors together generate an indication of the orientation of the sun relative to a target field of view which is a protected area. In an alternative embodiment, a digital sun sensor assembly is provided consisting of two or more independent digital channels and employing a slit aperture cooperating with a plurality of photocells laid out in a gray coded pattern. The digital device produces digital signals indicating relative position relative to axes in a plane. Such signals can be used during a spacecraft operation to override any other control logic in order to stop satellite motion that may bring the field of view of the protected instrument into an undesired orientation relative to the sun.

8 Claims, 3 Drawing Sheets

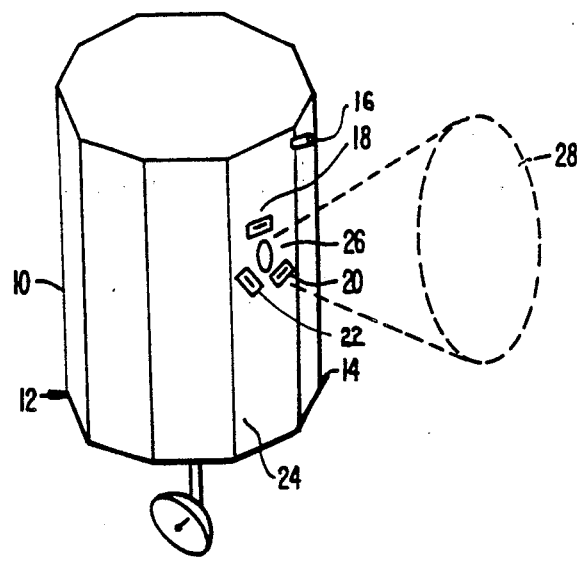
FIG._1.
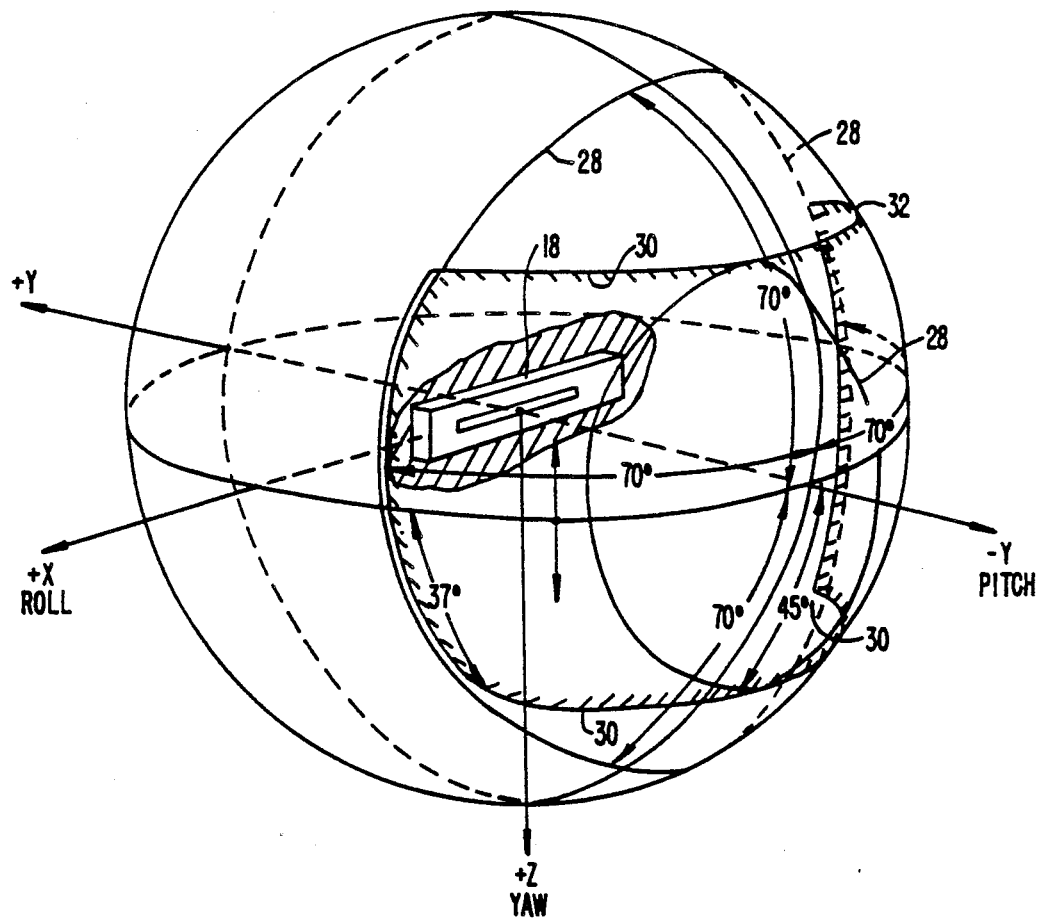
FIG._2.

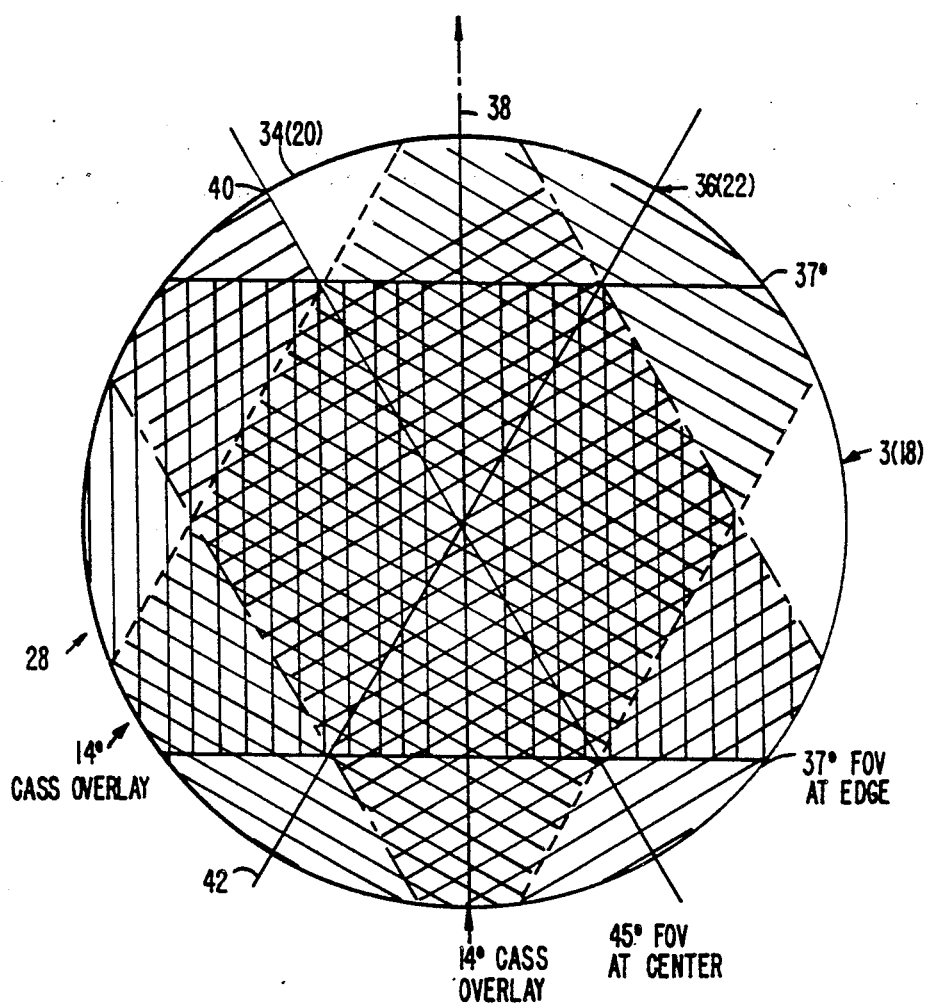
FIG._3.
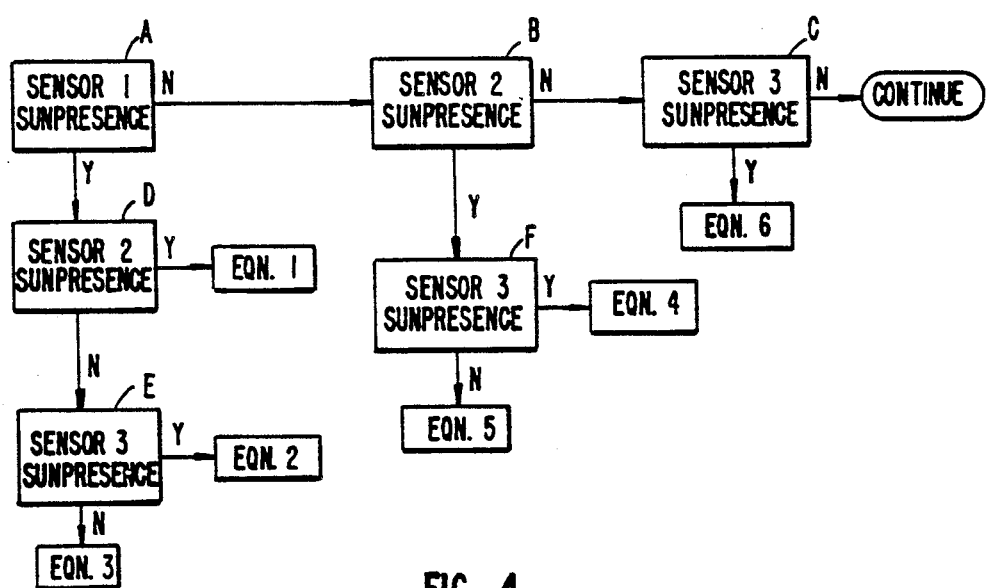
FIG._4.

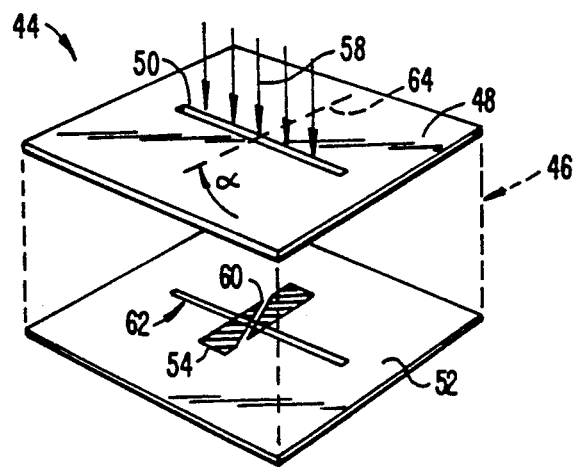
FIG._5.
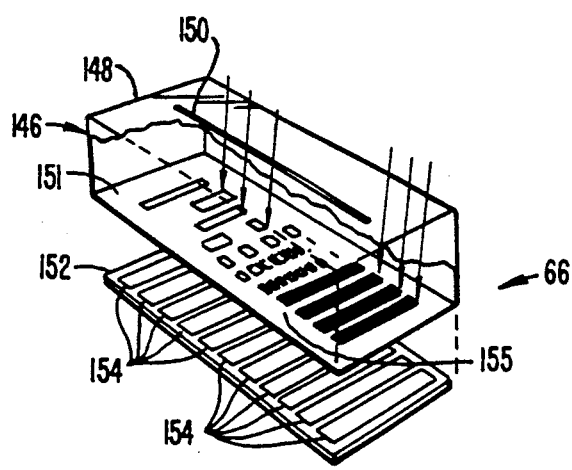
FIG._6.

ELECTRONIC SUN INCIDENCE AVOIDANCE DEVICE

BACKGROUND OF THE INVENTION

This invention relates to spacecraft attitude control, and more particularly, to a sensor on a spacecraft instrument for providing a signal indicating that the instrument is subject to being exposed to undesirable direct sunlight.

Earth and space sensing from spacecraft require protection of sensors from potential damage due to solar radiation impinging on the sensors. For example, for certain sensitive instruments, it is necessary to maintain extremely low temperatures on payload apertures and coolers. Sensors are often mounted on a planar outside surface of a spacecraft without a protective shutter or the like in order to conserve space.

As the low temperature requirements become more stringent, the effects of direct and indirect incident solar radiation on sensors and cooling apparatus become critical.

It has been conventional practice to place the cooler of a satellite on the intended north face such that the spacecraft under normal control, acts as a shield, which prevents sun incidence into the cooler. However, supercooled payloads require new technology to avoid indirect sunlight during all times during a mission. Direct sun incidence during such common maneuvers as stationkeeping or uncommon maneuvers relating to failures, loss of lock and the like, can damage delicate instruments irreparably.

What is needed is a new technique for avoiding incident solar radiation which protects an instrument sensor or cooler during normal operation and during most types of failures and which does not introduce an undesired weight penalty.

The following patents were uncovered in a search of the records of the United States Patent and Trademark Office in respect to the subject invention.

U.S. Pat. No. 3,348,374, to Schalkowsky, describes a sun-referenced orienting device which uses the sun to provide torques that will orient a spacecraft. As a result, it either points directly at the sun or away from the sun or in any preset angle therebetween. However, it is a type of device which carries an undesired weight penalty, which can be critical in space.

U.S. Pat. No. 3,427,453, to Gill et al., discloses a spacecraft having first sensors which normally provide signals in determining the attitude reference of the spacecraft until interfering solar radiation strikes certain sensors. At such a time, additional sensors are used to determine the attitude reference. The first sensors provide virtually no information regarding location of the source of radiation.

U.S. Pat. No. 3,439,884, to Slater, describes a device using the sun as a heliocentric reference point and a set of stars as another reference point to determine three-axis heliocentric attitude of a spacecraft. As with other references, the '884 patent relies on technology intended to seek out and focus on the sun.

U.S. Pat. No. 4,371,135, to Keigler, describes a system for collecting solar energy by directing the solar rays via one fixed mirror and one rotating mirror in order to direct sun rays to a solar panel at all times. This patent is cited for background showing other technologies.

U.S. Pat. No. 4,375,878, to Harvey et al., describes a satellite having a payload which may be independently oriented with respect to the main body of the satellite. Reference is made to use of either a star tracker or a sun sensor in a conventional method of centering the sensor on the reference.

U.S. Pat. No. 4,508,297, to Mouilhayrat et al., shows a system for arranging solar arrays at canted angles to obtain benefits for certain types of spacecraft.

U.S. Pat. No. 4,674,715, to Frisch applies specifically to a spacecraft platform which carries out one revolution in the orbit direction per orbit. The use of sensors on the platform itself is disclosed so as to improve the pointing performance of the platform and to avoid errors between the main body and the platform. The apparatus requires an accurate pointing device, possibly using the sun.

SUMMARY OF THE INVENTION

According to the invention, two or three one-dimensional sun sensing and angle measurement assemblies are deployed with substantially totally overlapping fields of view on a plane of a spacecraft body to protect sensors within a protected angular area of the plane, each of the analog sun sensors generating a signal indicative of incident sun along one axis and the presence of sunlight along an orthogonal axis thereto in the common plane. The sensors together generate an indication of the orientation of the sun relative to a target field of view which is a protected area. In an alternative embodiment, a digital sun sensor assembly is provided consisting of two or more independent digital channels and employing a slit aperture cooperating with a plurality of photocells laid out in a gray coded pattern. The digital device produces digital signals indicating relative position relative to axes in a plane. Such signals can be used during a spacecraft operation to override any other control logic in order to stop satellite motion that may bring the field of view of the protected instrument into an undesired orientation relative to the sun.

The invention has the advantage of use of lightweight and generally available light position sensors. However, such sensors are used in a structural arrangement to produce a result not associated with their previously-intended use.

The invention will be better understood by reference to the following detailed description in connection with the accompanying drawings.

BRIEF DESCRIPTION OF THE DRAWINGS

FIG. 1 is a perspective view of a spacecraft illustrating mounting of sun sensors for use in accordance with the invention.

FIG. 2 is a graphical illustration of the field of view of a single analog sun sensor used in accordance with the invention.

FIG. 3 is a schematic diagram of the overlapping fields of view of an analog sun sensor system in accordance with the invention.

FIG. 4 is a flow chart which illustrates the decision process for a three sensor configuration.

FIG. 5 is a pictorial diagram of an analog sun sensor of the type used in accordance with the invention.

FIG. 6 is a perspective view of a digital sun sensor of a type used in accordance with a second embodiment of the invention.

DESCRIPTION OF SPECIFIC EMBODIMENTS

Referring to FIG. 1, there is shown a perspective view of a spacecraft 10 having the typical control elements of a spacecraft, such as roll, pitch and yaw thrusters 12, 14, 16 and illustrating mounting of sun sensors 18, 20 and 22 on a face 24 for use in accordance with the invention to protect the an instrument 26 having an optically sensitive target field of view 28 or the like (such as a cooler associated with and instrument).

The spacecraft 10 is equipped with thruster firing and control logic (not shown), which is adapted to be overridden by signals from safety logic as hereinafter explained. The precise design of the thruster firing control circuitry is known to the art and need not be described in order to understand the subject invention.

There are preferably three sun sensors 18, 20 and 22 disposed on the face 24 to be protected and generally adjacent to or around the target field of view 28. The target field of view 28 is preferably conically shaped, as shown in FIG. 2.

The fields of view 32, 34 and 36 of the sensors 18, 20, 22 are selected so as to overlap one another and overlap and entirely cover the target field of view 28. Referring to FIG. 3, there is shown the projection of the fields of view 32, 34 and 36 of sun sensors 18, 20, and 22 on a plane. Each has an axis of orientation 38, 40 and 42 relative to which a relatively precise measure of the angle of incident optical radiation can be measured. Orthogonal to its axis of orientation, however, a single sensor 18, 20, and 22 can only sense the presence or absence of incident optical radiation within its field of view. Accordingly, in a preferred embodiment, the axes 38, 40 and 42 are oriented to one another at 120 degrees in the plane of the face 24. In a simpler case, only two one-dimensional sensors are required, although the field of view is narrower for two overlapping sensors.

FIG. 2 illustrates the field of view of a single sensor 18 projected on a sphere, which serves to illustrate this characteristic. The sensor 18 can only measure angle relative to the yaw axis z. At the center of the field of view, it can measure up to $+/-45$ degrees. At the periphery of the field of view, it can measure only up to $+/-37$ degrees. When three fields of view overlap, as shown in the projection of FIG. 3, there results a cone of protection for the target field of view 28 of a 70-degree solid angle using three two-dimensional angle measuring sensors. In addition to the broader view of view, a fail-safe safety margin is included by providing three overlapping fields of view. Should any one of the three angle sensors fail, sufficient information can be derived from the remaining two sensors to assure adequate position control, although the safety margin for the protected target field of view is reduced. Hence, the protected target field of view should be narrower than the narrowest overlapping of two sensor fields of view.

Sensor logic must be provided which provides the following test to check for the presence of undesired solar radiation within the safety zone defined around the target field of view:

IF (X2+Y2 .LE. LIMIT**2) GO TO SAFETY LOGIC where X and Y are defined positions along orthogonal axes in the plane of the face 24 where zero (0) is indicative of direct aligned with the sun. The sun position can then be calculated by examining sine and cosine signals from each of the sensors, and a procedure may be implemented, such as group thruster firing, to reorient the face 24 of the spacecraft away from the sun. This may typically be accomplished by holding the position of the spacecraft relative to the sun such that incident radiation is on the edge of the field of view of the sensors. (Correcting the cause of failure which caused the onset of the undesired orientation is a secondary procedure which depends on the failure mode.) It should be understood that knowledge of the relative position of the sun is critical to prevention of undesired damage to an instrument or the like which must have the target field of view protected from the sun. An ambiguous signal regarding sun position could for example cause the spacecraft to be rotated in the wrong direction, resulting in irreparable instrument damage.

FIG. 4 is a flow chart which illustrates the decision process for a three sensor configuration. The process is a binary decision tree scan of the presence outputs of each of the three sensors electronics for the state of a "presence" signal (in the three sequences Steps A, B, C, Steps A, B, F, and Steps A, B, E) and, depending on the state of the selected presence signals, selecting one of six error equations EQ. 1 through EQ. 6 to process. The equations give the attitude error away from the sun, which is nominally set to be along a common axis out of the face of the spacecraft. The appropriate measures to be taken due to sun presence in the field of a sensor depends on the type of satellite control system. However, the actions taken are based on the angles calculated by the error equations.

The sensors have associated electronics which generate the error signals E1, E2 and E3 representing the angles from the reference axis of each sensor. From these angles, the roll error R and pitch error P are calculated.

EQ. 1

$P = E1$ $R = (E2 - E1 * sin\ (30))\ cos\ (30)$

EQ. 2

$P = E1$ $R = (E3 + E1 * sin\ (30))/cos\ (30)$

EQ. 3

$P = E1$ $R = (90\ \text{degrees})$

EQ. 4

$R = E1 + E2$ $P = (E2 - R * cos\ (30))/sin\ (30)$

EQ. 5

$R * cos\ (30) + P * sin\ (30) = E2$ (based on geometry)

$P > 37$ degrees and

R < 30.6 degrees or

P < −37 degrees and

R > −30.6 degrees (Both errors must be of the same sign.)

EQ. 6

$R * \cos(30) - P * \sin(30) = E3$ (based on geometry)

P > +37 degrees and

R < −30.6 degrees or

P < −37 degrees and

R > +30.6 degrees (Errors must be of the opposite sign.)

There is a wide variety of available sun sensors which could be used in accordance with the invention. The sun sensors fall into two categories, a sensor from which signals can be directly processed to provide control signals to attitude control systems of the spacecraft and sensors whose output signals must be preprocessed and combined to provide control signals to the attitude control system. Equations EQ. 1 through EQ. 6 are of the type needed for the latter category.

FIG. 5 is a pictorial diagram of an analog sun sensor 44 of a type used in accordance with the invention with which equations EQ. 1 and EQ. 6 may be used. The sun sensor 44 comprises a casing 46 having a mask 48 with a slit aperture 50 therein opposite to a backplate 52. Mounted to the backplate 52 in the viewing region of the slit aperture 50 is a pair of photocells 54 and 56 arranged to receive complementary amounts of light 58 through the slit aperture 50. The photocells 54 and 56 may abut one another along a common margin 60 which is skewed to the projection of the slit aperture 50 on the backplate 52. The size of the area of each photocell 54, 56 illuminated by the slit image 62 of sunlight through the slit aperture 50 is a function of the angle α of light through the slit aperture 50 relative to an axis 64 in the plane of the mask 48 which is orthogonal to the slit aperture 50. Each photocell 54, 56 is therefore wedge-shaped thereby to produce a voltage in proportion to the angle of radiation because of the variable amount of optical radiation incident thereon from the slit aperture 50. The photocells 54, 56 receive complementary amounts of incident optical radiation as a function of angle of optical radiation through the slit aperture. The complementary voltages are then used to produce a ratio signal. The ratio signal of the two photocell signals, which is an analog current or voltage, is proportional to the angle. Since it is a ratio, the signal is compensated for variations due to absolute magnitude of the input light, common mode photocell changes and calibration errors. An analog sun sensor of this type is available as a commercial component as a CASS (CASS=Coarse Analog Sun Sensor) optics head (Adcole Part No. 27890, made by Adcole Corp. of Marlborough, Mass.) and electronics unit (Adcole 28040). Other sun sensors may also be suitable, such as a digital sun sensor (DSS) optics head (Adcole 28230) and electronics unit (Adcole 28050) or a cosine-law analog sun sensor.

FIG. 6 is a perspective view of a digital sun sensor 66 of a type suitable for producing a digital signal indicative of sun angle. The sun sensor 66 comprises a casing 146 having a first mask 148 with a slit aperture 150 therein opposite to a second mask 151. Under the second mask 151 and mounted to the backplate 152 in the viewing region of the slit aperture 150 is an array of rectangular photocells 154 arranged under the second mask 151 across the slit aperture 150. The size of the area of each photocell 154 illuminated by sunlight through the slit aperture 150 is a function of the angle α of light through the slit aperture 150 and the pattern of the second mask 151. Sun rays pass through the slit aperture 150 and the apertures in the second mask 151 to the array of photocells 154 behind the second mask 151. Each photocell 154 aligned with a unique row of apertures 155 in the second mask 151. The pattern of apertures 155 is a gray code. The presence or absence of light on one of the photocells 155 is registered as a one or a zero digital value. The signal output of each of the photocells is one bit of a single gray-coded digital word. The digital word is directly readable as a digital measure of the angle of incident light relative to the slit axis. There is no need to measure magnitude of voltage or current to obtain the angle of radiation. (However, code patterns in the mask may lend themselves to conversion to an analog value by summation of digital values.) Digital sun sensors 66 of this type may be deployed in the same manner as analog sun sensors with overlapping reception patterns. Unlike conventional applications of sun sensors, where there is generally little overlap in the fields of view, the sensors herein described are used in a nonconventional manner to detect presence of sun at the edge of a field of view and then used to measure angle within extensively overlapped fields of view. Because there is such a high overlap of sensors' fields of view, the cone of protection for the target field of view is larger than the field of view of any one or any two combined sensor.

The invention has now been described with reference to specific embodiments. Other embodiments will be apparent to those of ordinary skill in the art. It is therefore not intended that this invention be limited, except as indicated in the appended claims.

I claim:

1. An apparatus for sensing position of the sun relative to a target field of view of a surface region of a spacecraft having attitude control means for use in controlling attitude of the spacecraft relative to the sun in order to protect said surface region from undesired incident solar radiation, said apparatus comprising:

a first optical sensor means mounted adjacent said target field of view, said first sensor means having a first axis of orientation along said surface region, said first sensor means having a first detector which senses presence of the incident solar radiation within a first sensor field of view encompassing said target field of view and which measures angle of the incident solar radiation only along said first axis of orientation across said first sensor field of view, for generating first output signals indicating presence and angle of incidence of the undesired incident solar radiation along said first axis of orientation within said first sensor field of view;

a second optical sensor means substantially identical to said first sensor means mounted adjacent said target field of view, said second sensor means having a second axis of orientation along said surface region, said second sensor means having a second detector which senses presence of the incident solar radiation within a second sensor field of view encompassing said target field of view and which measures angle of the incident solar radiation only along said second axis of orientation along said second sensor field of view, for generating second output signals indicating presence and angle of incidence of the undesired incident solar radiation along said second axis of orientation within said second sensor field of view, said second sensor field of view overlapping said first sensor field of view and said second axis of orientation being transverse to said first axis of orientation; and logic means coupled to receive said first output signals and said second output signals for interpreting said first output signals and said second output signals to control said attitude control means to change attitude of said spacecraft in order to prevent undesired incident solar radiation from impinging on said target field of view.

2. The apparatus according to claim 1 wherein said first axis of orientation is orthogonal to said second axis of orientation.

3. The apparatus according to claim 1 further including a third optical sensor means substantially identical to said first sensor means mounted adjacent said target field of view, said third sensor means having a third axis of orientation along said surface region, said third sensor means having a third detector which senses presence of the incident solar radiation within a third sensor field of view encompassing said target field of view and which measures angle of the incident solar radiation only along said third axis of orientation along said third sensor field of view, for generating third output signals indicating presence and angle of incidence of the undesired incident solar radiation along said third axis of orientation within said third sensor field of view, said third sensor field of view overlapping said first sensor field of view and said second sensor field of view and said third axis of orientation being transverse to said first axis of orientation and transverse to said second axis of orientation; and wherein said logic means further includes means couple to receive said third output signals to control said attitude control means to change attitude to avoid undesired incident solar radiation on said target field of view whenever undesired incident solar radiation is detected simultaneously within any two of said first, second and third fields of view.

4. The apparatus according to claim 3 wherein said first axis of orientation is disposed at an angle of 120 degrees to said second axis of orientation and to said third axis of orientation.

5. The apparatus according to claim 1 wherein said optical sensor means is a digital sun sensor comprising an array of discrete photocell bars arranged in parallel rows relative to a slit aperture and overlaid with a coded pattern of apertures relative to the slit aperture, each said photocell being selectively excited by a portion of a slit of optical radiation incident on said photocells through said coded pattern of apertures to produce in combination a unique digital bit pattern signal for each angle of the slit of optical radiation, said unique digital bit pattern being indicative of angle information for said logic means.

6. The apparatus according to claim 1 wherein said optical sensor means is an analog sun sensor comprising a slit aperture and a pair of photocells producing a voltage in proportion to the amount of optical radiation incident thereon, said photocells being oriented to said slit aperture to receive complementary amounts of incident optical radiation as a function of angle of optical radiation through said slit.

7. A method for sensing position of the sun relative to a target field of view of a surface region of a spacecraft having attitude control means for use in controlling attitude of the spacecraft relative to the sun in order to protect said surface region from undesired incident solar radiation, said method comprising:

sensing for presence of incident solar radiation at margins of a first field of view through a first optical sensor means mounted adjacent said target field of view, said first sensor means having a first axis of orientation along said surface region, said first sensor means having a first detector which senses presence of the incident solar radiation within said first field of view encompassing said target field of view and which measures angle of the incident solar radiation only along said first axis of orientation across said first field of view, and generating first output signals indicating presence and angle of incidence of the undesired incident solar radiation along said first axis of orientation within said first field of view;

sensing for presence of incident solar radiation at margins of a second field of view through a second optical sensor means substantially identical to said first sensor means mounted adjacent said target field of view, said second sensor means having a second axis of orientation along said surface region, said second sensor means having a second detector which senses presence of the incident solar radiation within said second field of view encompassing said target field of view and which measures angle of the incident solar radiation only along said second axis of orientation along said second field of view, and generating second output signals indicating presence and angle of incidence of the undesired incident solar radiation along said second axis of orientation within said second field of view, said second field of view substantially totally overlapping said first field of view and said second axis of orientation being transverse to said first axis of orientation; and upon sensing presence of said incident solar radiation at margins of said first field of view and said second field of view, measuring angle of incident solar radiation and in response;

initiating measures to prevent incident radiation from impinging upon said target field of view.

8. A method for sensing position of the sun relative to a target field of view of a surface region of a spacecraft having attitude control means for use in controlling attitude of the spacecraft relative to the sun in order to protect a target field of view of said surface region from undesired incident solar radiation, said method comprising:

sensing for presence of incident solar radiation at margins of a first field of view through a first optical sensor having a first axis of orientation;

sensing for presence of incident solar radiation at margins of a second field of view substantially totally overlapping said first field of view through a second optical sensor having a second axis of orientation, said second axis of orientation being transverse to said first axis of orientation; and upon sensing presence of said incident solar radiation at said margins of said first field of view and said second field of view, measuring angle of incident solar radiation and in response;

initiating measures to prevent incident radiation from impinging on said target field of view.

* * * * *